US010425185B2

United States Patent
Wikström et al.

(10) Patent No.: US 10,425,185 B2
(45) Date of Patent: Sep. 24, 2019

(54) WLAN NODES, AND METHODS THEREIN FOR EFFICIENT USAGE OF WLAN RESOURCES

(71) Applicant: Telefonaktiebolaget LM Ericsson (publ), Stockholm (SE)

(72) Inventors: Gustav Wikström, Täby (SE); Filip Mestanov, Brottby (SE); Johan Söder, Stockholm (SE); Soma Tayamon, Stockholm (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/754,571

(22) PCT Filed: Aug. 25, 2015

(86) PCT No.: PCT/SE2015/050895
§ 371 (c)(1),
(2) Date: Feb. 22, 2018

(87) PCT Pub. No.: WO2017/034446
PCT Pub. Date: Mar. 2, 2017

(65) Prior Publication Data
US 2018/0248646 A1     Aug. 30, 2018

(51) Int. Cl.
*H04L 1/00* (2006.01)
*H04L 25/00* (2006.01)
(Continued)

(52) U.S. Cl.
CPC .......... *H04L 1/0003* (2013.01); *H04L 1/0009* (2013.01); *H04L 1/0034* (2013.01);
(Continued)

(58) Field of Classification Search
CPC .. H04W 84/12; H04W 36/04; H03M 13/1117; H04L 1/005; H04L 1/0058
See application file for complete search history.

(56) References Cited

U.S. PATENT DOCUMENTS 9,379,837 B2 *  6/2016  Jindal .................. H04J 11/0026
2006/0079183 A1   4/2006  Song et al.
(Continued)

FOREIGN PATENT DOCUMENTS

EP    1 289 181 A1    3/2003
EP    1 895 714 A1    3/2008
(Continued)

OTHER PUBLICATIONS

Supplementary European Search Report, EP 15902378.7, dated Jul. 18, 2018, 11 pages. International Search Report and Written Opinion of the International Searching Authority, PCT/SE2015/050895, dated Apr. 20, 2016, 14 pages.
International Preliminary Report on Patentability, PCT/SE2015/050895, dated Jul. 5, 2017, 16 pages.

*Primary Examiner* — Chandrahas B Patel
(74) *Attorney, Agent, or Firm* — Sage Patent Group

(57) ABSTRACT

A first Wireless Local Area Network (WLAN) node and a method therein for performing a transmission to a second WLAN node in a WLAN. The first WLAN node identifies a third WLAN node transmitting a first signal (S1) overheard by the first WLAN node, and determines to transmit, to the second WLAN node, a second signal (S2) based on the identity of the third WLAN node and on a received power of the first signal. When determined to transmit the second signal, the first WLAN node determines a Modulation and Coding Scheme (MCS) index value by means of a link adaptation process specific for the identified third WLAN node and transmits to the second WLAN node, the second signal using the determined MCS index.

25 Claims, 6 Drawing Sheets

(51) Int. Cl.
    *H04W 24/02*     (2009.01)
    *H04W 74/08*     (2009.01)
    *H04W 72/08*     (2009.01)
    *H04W 84/12*     (2009.01)
    *H04W 72/04*     (2009.01)

(52) U.S. Cl.
    CPC ............ *H04L 1/0035* (2013.01); *H04L 25/00* (2013.01); *H04W 24/02* (2013.01); *H04W 72/082* (2013.01); *H04W 74/0808* (2013.01); *H04W 72/0426* (2013.01); *H04W 84/12* (2013.01)

(56) References Cited

U.S. PATENT DOCUMENTS

| | | |
|---|---|---|
| 2014/0140312 A1 | 5/2014 | Lee et al. |
| 2014/0286203 A1 | 9/2014 | Jindal et al. |
| 2014/0328191 A1 | 11/2014 | Barriac et al. |
| 2015/0078299 A1 | 3/2015 | Barriac et al. |

FOREIGN PATENT DOCUMENTS

| | | |
|---|---|---|
| WO | WO 2012/044866 A1 | 4/2012 |
| WO | WO 2014/047773 A1 | 4/2014 |
| WO | WO 2014/047815 A1 | 4/2014 |
| WO | WO 2014/190275 A1 | 11/2014 |

\* cited by examiner

Fig. 4 Method performed by 1st WLAN Node 212

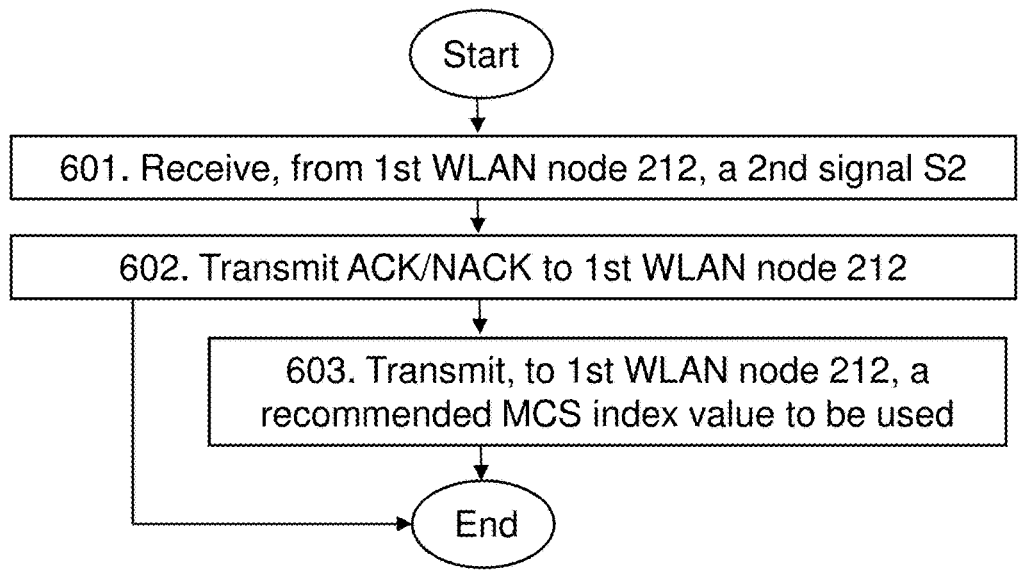
Fig. 6 Method performed by 2nd WLAN node 214
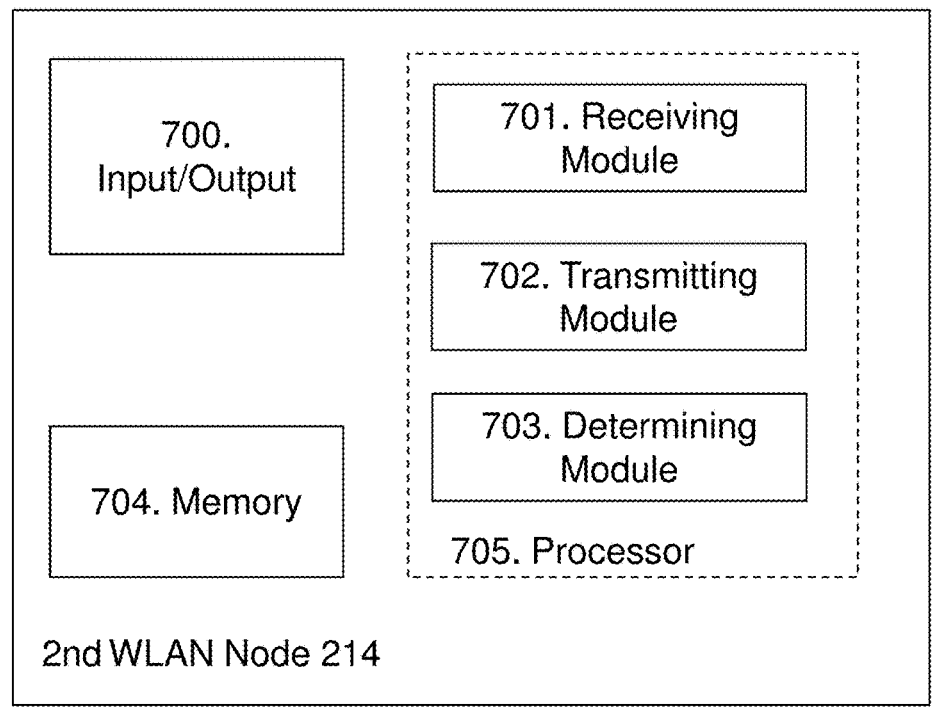
Fig. 7

WLAN NODES, AND METHODS THEREIN FOR EFFICIENT USAGE OF WLAN RESOURCES

CROSS REFERENCE TO RELATED APPLICATIONS

This application is a 35 U.S.C. § 371 national stage application of PCT International Application No. PCT/SE2015/050895 filed on Aug. 25, 2015, the disclosure and content of which is incorporated by reference herein in its entirety.

TECHNICAL FIELD

Embodiments herein relate generally to a first Wireless Local Area Network (WLAN) node, a second WLAN node and to methods therein. In particular, they relate to the transmission from the first WLAN node to the second WLAN node.

BACKGROUND

Communication devices such as terminals are also known as e.g. User Equipments (UE), mobile terminals, wireless devices, wireless terminals, mobile stations and/or stations (STAs). Such terminals are enabled to communicate wirelessly in a wireless communications network such as a Wireless Local Area Network (WLAN) and/or a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

These terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

In a wireless communications network such as a Wireless Local Area Network (WLAN), the communications device may further be referred to as a network node such as a WLAN node. The WLAN node may be an access node such as an Access Point (AP) or a station (STA).

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

In WLANs, a Clear Channel Assessment (CCA) Threshold (CCAT) is specified to define a range within which a WLAN node, e.g. an Access Point (AP) or a station (STA), will sense the transmission of other WLAN nodes to avoid transmission collision, e.g. interference.

Using a threshold based on received power regardless of which one of the WLAN nodes that is generating the interference is not optimal from a performance perspective, since WLAN nodes operating in the WLAN may be prevented from transmitting even though the transmission is likely to be successful and not disturb other ongoing transmissions. With adequate link adaptation it is possible to operate in reuse-1 mode, i.e. only defer from transmitting concurrently with transmissions from a WLAN node comprised in the same coverage area as the WLAN node intending to transmit.

WLAN, also known as Wi-Fi is standardized in the Institute of Electrical and Electronics Engineers (IEEE) "Standard for Information technology—Tele-communications and information exchange between systems. Local and metropolitan area networks—Specific requirements. Part 11: Wireless LAN Medium Access Control (MAC) and Physical Layer (PHY) 802.11 Specifications (IEEE 802.11 specifications). In this disclosure the terms Wi-Fi and WLAN will be used interchangeably. Wi-Fi is a technology that currently mainly operates on the 2.4 GHz or the 5 GHz frequency band. The IEEE 802.11 specifications regulate the WLAN nodes, e.g. the APs or STAs, PHY layer, MAC layer and other aspects to secure compatibility and inter-operability between APs and STAs. In this disclosure, the STA may also be referred to as a wireless device or a UE. Wi-Fi is generally operated in unlicensed bands, and as such, communication over Wi-Fi may be subject to interference sources from any number of both known and unknown WLAN nodes. Further, Wi-Fi is commonly used as wireless extensions to fixed broadband access, e.g., in domestic environments and hotspots, like airports, train stations and restaurants.

A Modulation and Coding Scheme (MCS) index is a value, e.g. an integer, describing the modulation type, code rate and number of streams used in a transmission. The MCS index starts at 0 corresponding to the lowest link bitrate. For a 20 MHz channel the MCS index goes up to 7, 15, 23, and 31 for 1, 2, 3, and 4 spatial streams, respectively. The higher the MCS index is, the more sensitive the transmission is to interference, but the transmission will carry a higher amount of data. The MCS index is selected by a process, e.g. an algorithm commonly referred to as link adaptation. This is a proprietary implemented algorithm that uses available knowledge of the channel quality, e.g. a Signal-to-Interference-Plus-Nose Ratio (SINR), situation. The knowledge is inferred through e.g. historical data on failure rates for transmissions with different MCS's.

The WLAN technologies rely on Carrier Sensing Multiple Access with Collision Avoidance (CSMA/CA) in order to effectively and fairly share the wireless medium among the different WLAN nodes operating in the WLAN. The CSMA/CA may even be used to effectively and fairly share the wireless medium among different Radio Access Technologies (RATs). The CSMA/CA applied by the WLAN system demands that every device, e.g. WLAN node, that wishes to send data senses the common communication channel before carrying a transmission. This is in order to avoid duplicate transmissions that usually results in loss of data and in the need of retransmissions. In order for a device to deem the communication channel busy, it has to detect a transmission, and the received signal strength level of the detected transmission must surpass a pre-determined threshold. In this disclosure the pre-determined threshold is sometimes referred to as a Clear Channel Assessment (CCA) Threshold (CCAT). FIG. 1 schematically illustrates a wireless communications network according to prior art. The wireless communications network comprises an access point AP configured for communication with two stations, STA A and STA B, respectively, arranged in the wireless communications network. Further, the pre-determined threshold CCAT is schematically illustrated in FIG. 1. Thus, if one of the WLAN nodes comprised in the wireless communications network detects a transmission and if the the received signal strength level of the detected transmission surpasses the pre-determined threshold COAT, the WLAN node will deem the communication channel busy and defer from transmitting.

In current WLAN systems, one common COAT is defined for all WLAN nodes operating in the WLAN, and this common COAT is to be used when performing channel sensing for transmission to and from any WLAN node in the WLAN. Thereby, a WLAN node may be prevented from transmitting even though the transmission is likely to be successful and likely not to disturb other ongoing transmissions. This results in an inefficient usage of WLAN resources.

SUMMARY

Therefore, an object of embodiments herein is to provide a way of improving the performance in a wireless communications network using WLAN.

According to a first aspect of embodiments herein, the object is achieved by a method performed by a first Wireless Local Area Network (WLAN) node for performing a transmission to a second WLAN node in a WLAN.

The first WLAN node identifies a third WLAN node transmitting a first signal overheard by the first WLAN node, and determines to transmit to the second WLAN node, a second signal based on the identity of the third WLAN node and on a received power of the first signal.

When determined to transmit the second signal, the first WLAN node determines a Modulation and Coding Scheme (MCS) index by means of a link adaptation process specific for the identified third WLAN node and transmits, to the second WLAN node, the second signal using the determined MCS index.

According to a second aspect of embodiments herein, the object is achieved by a first Wireless Local Area Network (WLAN) node for performing a transmission to a second WLAN node in a WLAN.

The first WLAN node is configured to identify a third WLAN node transmitting a first signal overheard by the first WLAN node and to determine to transmit to the second WLAN node, a second signal based on the identity of the third WLAN node and on a received power of the first signal.

When determined to transmit the second signal, the first WLAN node is configured to determine a Modulation and Coding Scheme (MCS) index by means of a link adaptation process specific for the identified third WLAN node, and to transmit, to the second WLAN node, the second signal using the determined MCS index.

According to a third aspect of embodiments herein, the object is achieved by a method performed by a second Wireless Local Area Network (WLAN) node for assisting a first WLAN node comprised in a WLAN to perform a transmission to the second WLAN node.

The second WLAN node receives, from the first WLAN node, a second signal transmitted using a Modulation and Coding Scheme (MCS) index.

Further, the second WLAN node transmits, to the first WLAN node, an acknowledgement of receipt of the second signal.

Furthermore, the second WLAN node transmits, to the first WLAN node, information relating to a recommended MCS index to be used when the first WLAN node overhears a first signal from a third WLAN node and is to transmit to the second WLAN node.

According to a fourth aspect of embodiments herein, the object is achieved by a second Wireless Local Area Network (WLAN) node for assisting a first WLAN node comprised in a WLAN to perform a transmission to the second WLAN node.

The second WLAN node is configured to receive, from the first WLAN node, a second signal transmitted using a Modulation and Coding Scheme (MCS) index.

Further, the second WLAN node is configured to transmit, to the first WLAN node, an acknowledgement of receipt of the second signal.

Furthermore, the second WLAN node is configured to transmit, to the first WLAN node, information relating to a recommended MCS index to be used when the first WLAN node overhears a first signal from a third WLAN node and is to transmit to the second WLAN node.

According to a fifth aspect of embodiments herein, the object is achieved by a computer program, comprising instructions which, when executed on at least one processor, causes the at least one processor to carry out the method in the first WLAN node.

According to a sixth aspect of embodiments herein, the object is achieved by a computer program, comprising instructions which, when executed on at least one processor, causes the at least one processor to carry out the method in the third WLAN node.

According to a seventh aspect of embodiments herein, the object is achieved by a carrier comprising the computer program, wherein the carrier is one of an electronic signal, optical signal, radio signal or computer readable storage medium.

Since the first WLAN node identifies a third WLAN node transmitting a first signal overheard by the first WLAN node; determines to transmit, to the second WLAN node, a second signal based on the identity of the third WLAN node and on a received power of the first signal, and since the first WLAN node, when determined to transmit the second signal, determines an MCS index by means of a link adaptation process specific for the identified third WLAN node and transmits, to the second WLAN node, the second signal using the determined MCS index, the transmissions in the WLAN is controlled such that the transmission of the second signal does not disturb the transmission of the first signal. Thereby, the interference in the WLAN is reduced. This results in an improved performance in the wireless communications network.

An advantage by embodiments herein is that an efficient usage of WLAN resources is provided.

Another advantage of some embodiments herein is that a maximized channel utilization is provided by allowing WLAN nodes in every BSS to access the WLAN at all times. The increased interference from this approach is handled by finding the appropriate MCS for every coincident transmission identity. Intra-BSS collisions may be avoided by keeping a list of BSS Partial Access ID (PAID) values.

Another advantage of some embodiments herein is that communication latency may be reduced when WLAN nodes get more frequent transmission opportunities.

BRIEF DESCRIPTION OF DRAWINGS

Examples of embodiments herein are described in more detail with reference to attached drawings in which:

FIG. 6 is a flowchart depicting embodiments of a method performed by a second WLAN node;

FIG. 7 is a schematic block diagram illustrating embodiments of a second WLAN node.

DETAILED DESCRIPTION

As part of developing embodiments herein, some problems will first be identified and discussed.

As previously mentioned, by using only one threshold in a WLAN node, e.g. a STA or an AP, for the CCA, the WLAN node may be prevented from transmitting even if the transmission is likely to be successful and unlikely to disturb any ongoing transmissions. This is therefore not an efficient use of the available spectrum.

Two tasks should be fulfilled through a CCA. A first task is to make sure that the intended transmission is received at a receiving WLAN node with an acceptable SINR. A second task is that ongoing transmissions should not be harmed.

If a CCAT value is set too low, the WLAN node will defer from transmitting even when it is likely that the transmission will be successful and not disrupt any ongoing transmissions. However, increasing the threshold value makes the transmission more vulnerable for interference, which not all transmission links is able to survive. Therefore, the threshold value has to be set for every link individually, and the level should adapt to the link quality. Also, increasing the threshold value creates interference towards other links. Therefore, the threshold value should be set in such a way that as few other transmissions as possible are interfered.

These and other shortcomings are addressed by embodiments herein.

In some embodiments herein an interferer, e.g. a transmitting WLAN node, is identified by a WLAN node intending to transmit and sensing the transmission from the transmitting WLAN node. The WLAN node intending to transmit identifies the transmitting WLAN node by reading information comprised in the sensed transmission. The WLAN node intending to transmit may take a decision whether to transmit or not based on the identity. If decided to transmit, the WLAN node intending to transmit uses a link adaptation process specific for the identified transmitting WLAN node in order to set a MCS index for the intended transmission in order not to cause interference with the sensed transmission. Then the WLAN node intending to transmit transmits the intended transmission using the MCS index.

The information read by the WLAN node intending to transmit may be a Partial Access ID (PAID) field of a Very High Throughput (VHT) PHYsical (PHY) preamble or a Source Address (SA) field of a Medium Access Control (MAC) header of the sensed transmission.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 1:
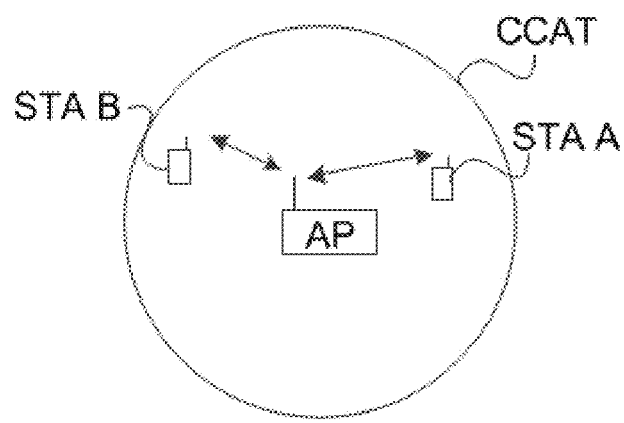
FIG. 1 schematically illustrates a wireless communications network according to prior art.
Figure 2:
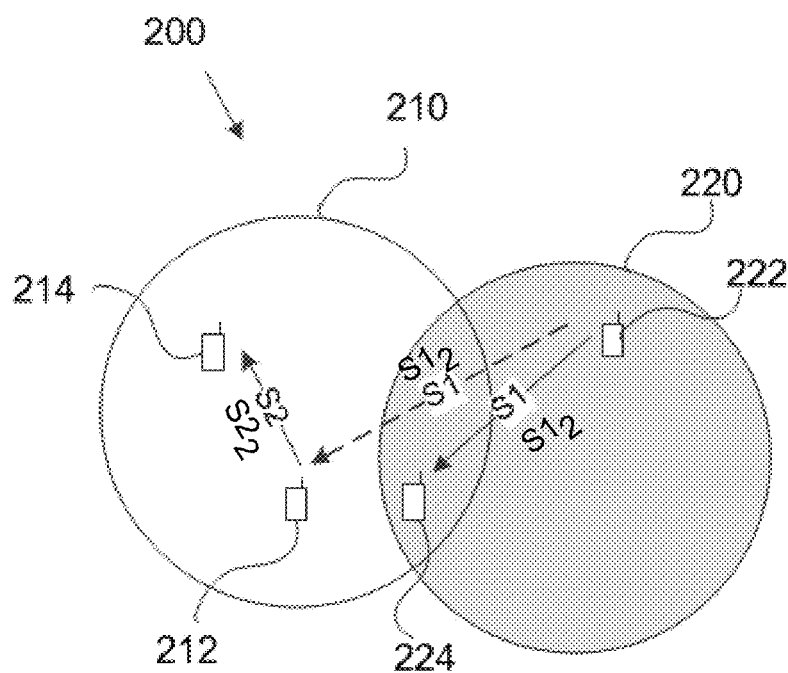
FIG. 2 schematically illustrates an embodiment of a wireless communications network.

FIG. 2 illustrates an example of a wireless communications network 200 in which embodiments herein may be implemented. The wireless communications network 200 comprises a WLAN and/or a cellular communications network. Thus, the wireless communications network 200 may be an integrated wireless communications network. Sometimes, the wireless communications network 200 comprises two or more wireless communications sub-networks, which sub-networks may be different types of wireless communications networks or may be the same type of wireless communications network but belonging to different operators.

The WLAN may be any wireless computer network that by means of a wireless distribution method links two or more devices within a limited area such as a home, a school, a shopping mall, a coffee shop, a computer laboratory, or an office building. The wireless distribution method may be a spread-spectrum method or an Orthogonal Frequency-Division Multiplexing (OFDM) radio method. For example, the WLAN may be implemented according to the IEEE 802.11 standard. The IEEE 802.11 standard comprises a set of Media Access Control (MAC) and PHYsical layer (PHY) specifications for implementing WLAN computer communication in the 2.4, 3.6, 5 and 60 GHz frequency bands.

The cellular communications network or sub-networks may be an LTE network, any other 3GPP cellular network, Worldwide Interoperability for Microwave Access (Wi-MAX), or any other cellular network or system.

A first coverage area 210 and a second coverage area 220 are comprised in the wireless communications network 200. The first coverage area 210 is a coverage area of one or more WLAN nodes comprised in a first Basic Service Set (BSS). The second coverage area 220 is a coverage area of one or more WLAN nodes comprised in a second BSS. The first and second BBS defines a respective set of connected WLAN nodes. Further, sometimes in this disclosure, the first and second coverage areas 210, 220 are referred to as first and second BSS coverage areas.

Two or more WLAN nodes, such as a first WLAN node 212 and a second WLAN node 214 are comprised in the first BSS and are configured to operate in the first coverage area 210. Further, one or more WLAN nodes, such as a third WLAN node 222 and possibly a fourth WLAN node 224 are comprised in the second BSS and are configured to operate in the second coverage area 220.

Further, the first WLAN node 212 is configured to communicate with the second WLAN node 214 when the second WLAN node 214 supports communication with the first WLAN node 212 and when the second WLAN node 214 is within the first coverage area 210.

The third WLAN node 222 is configured to communicate with the fourth WLAN node 224, when the fourth WLAN node 224 supports communication with the third WLAN node 222 and when the fourth WLAN node 224 is within the second coverage area 220.

In some embodiments, the first coverage area 210 is at least partly overlapping with the second coverage area 220.

The first, second, third and fourth WLAN nodes 212, 214, 222, 224 may each be a wireless AP node, a WLAN AP node, a Licensed Assisted Access LTE (LAA-LTE) node, or a Station (STA) such a wireless device. The wireless device may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in the wireless communications network 200. Please note that the term user equipment used in this document also covers other wireless devices such as Machine to Machine (M2M) devices, even though they do not have any user.

Sometimes herein, the terms "WLAN node", "AP node" and "LAA-LTE node" are used interchangeably.

In some embodiments, the first, second, third and fourth WLAN nodes 212, 214, 222, 224 are different types of WLAN nodes. For example, the first and third WLAN nodes 212, 222 may be WLAN AP nodes and the second and fourth WLAN nodes 214, 224 may be LAA-LTE nodes or STAs, or vice versa. However, the WLAN nodes 212, 214, 222, 224 may be the same type of WLAN nodes. For example, the WLAN nodes 212, 214, 222, 224 may be WLAN AP nodes, LAA-LTE nodes and/or STAs.

Further, each of the first, second, third and fourth WLAN nodes 212, 214, 222, 224 is a device that allows one or more WLAN nodes to connect to a wired network using W-Fi, or related standards. The first, second, third and fourth WLAN nodes 212, 214, 222, 224 may connect to a router (not shown) via a wired network but it may also be an integral component of the router itself.

Figure 3:
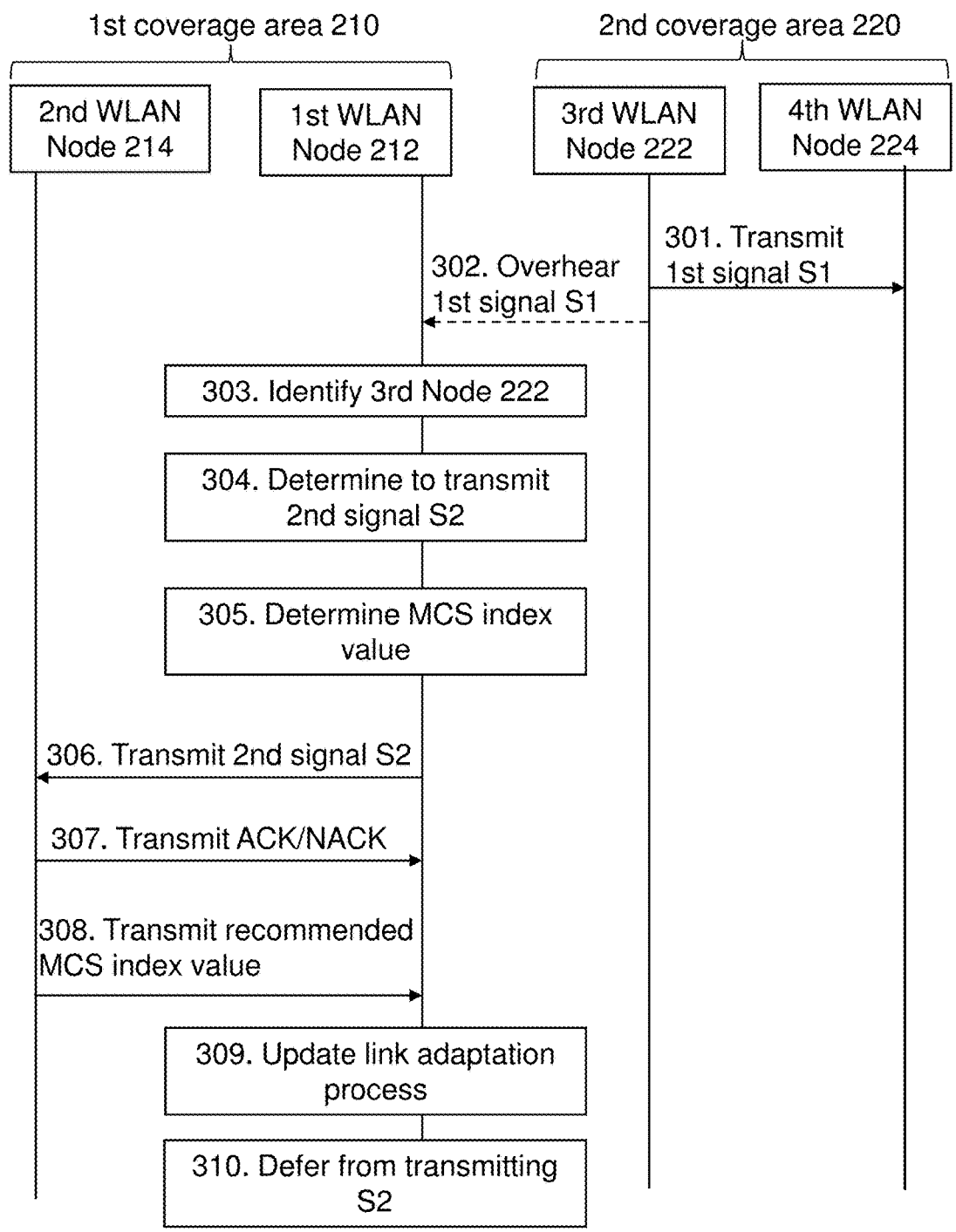
FIG. 3 is a schematic combined flowchart and signalling scheme of embodiments of a wireless communications network.

An example of a method performed in embodiments of the wireless communications network 200 for performing a transmission from the first WLAN node 212 to the second WLAN node 214 will now be described with reference to a schematic combined flowchart and signalling scheme schematically illustrated in FIG. 3. As mentioned above, the first and second WLAN nodes 212, 214 are comprised in the first coverage area 210. In such case, the first and second WLAN nodes 212, 214 are said to belong to the first BSS and to be operating in the first coverage area 210.

The method comprises one or more of the following actions. It should be understood that some actions are optional, that actions may be taken in another suitable order and that actions may be combined.

Action 301

The third WLAN node 222 transmits a first signal S1 to the fourth WLAN node 224. As previously mentioned, the third and fourth WLAN nodes 222, 224 may be comprised in the second coverage area 220. In such case, the third and fourth WLAN nodes 222, 224 are said to belong to the second BSS and to be operating in the second coverage area 220.

Action 302

The first WLAN node 212 overhears the first signal S1 transmitted between the third and fourth WLAN nodes 222, 224. Sometimes herein this is also referred to as the first WLAN node 212 senses the first signal S1. The first WLAN node 212 is a WLAN node intending to transmit a second signal S2 to the second WLAN node 214. As will be described below, whether or not the first WLAN node 212 transmits the second signal S2 to the second WLAN node 214 will depend on whether or not the second signal S2 will cause interference and/or disturb the ongoing transmission of S1. In other words, whether or not the first WLAN node 212 transmits the second signal S2 to the second WLAN node 214 will depend on the identity of the third WLAN node 222 and on the received power of the overheard first signal S1. It should be understood that the received power of the overheard first signal S1 is the power of the first signal S1 when overheard by the first WLAN node 212, e.g. at the first WLAN node 212. The received power may be measured and/or determined by the first WLAN node 212.

This action relates to Action 401 which will be described below.

Action 303

When the first WLAN node 212 has overheard the first signal S1, the first WLAN node 212 identifies the third WLAN node 222 transmitting the first signal S1. This will be used to determine e.g. the BSS the third WLAN node 222 belongs to. As will be described below, the first WLAN node 212 will defer from transmitting the second signal S2 to the second WLAN node 214 when the third WLAN node 222 belongs to the same BSS, e.g. the first BSS, and therefore are operating in the same coverage area, e.g. the first coverage area 210, as the first WLAN node 212 and when the received power of the overheard first signal S1 is above a predefined threshold value. How the first WLAN node 212 identifies the third WLAN node 222 will be described in more detail below. The first WLAN node 212 further establishes the power of the received, i.e. overheard signal S1. That is, the first WLAN node 212 determines the received power of the overheard signal S1.

Action 303 relates to Action 401 which will be described below.

Action 304

The first WLAN node 212 determines whether to transmit a second signal S2 to the second WLAN node 214 based on the identity of the third WLAN node 222 and based on a received power of the first signal S1, e.g. based on the received power of the overheard signal S1. As will be described in more detail below, the first WLAN node 212 will defer from transmitting the second signal S2 to the second WLAN node 214 when the third WLAN node 222 belongs to the same BSS, e.g. the first BSS, and therefore are operating in same the same coverage area, e.g. the first coverage area 210, as the first WLAN node 212 and when the received power of the overheard first signal S1 is above a predefined threshold value. Thereby, interference and transmission collisions may be avoided.

This action relates to Actions 402 which will be described below.

Action 305

When the first WLAN node 212 has determined to transmit the second signal S2 to the second WLAN node 214, the first WLAN node 212 determines a Modulation and Coding Scheme (MCS) index by means of a link adaptation process specific for the identified third WLAN node 222 in order to avoid that the second signal S2 interferes with the first signal S1.

Action 305 relates to Action 403 which will be described below.

Action 306

The first WLAN node 212 transmits the second signal S2 to the second WLAN node 214 using the determined MCS index.

Action 306 relates to Actions 404 and 601 which will be described below.

Action 307

The second WLAN node 214 may transmit, to the first WLAN node 212, an acknowledgement of receipt of the second signal S2. The acknowledgement of receipt may comprise an affirmative response, e.g. an ACKnowledge character (ACK), or a negative response, e.g. a Negative-ACKnowledge character (NACK). Thereby, the second WLAN node 214 informs the first WLAN node 212 whether or not the second signal S2 or a part thereof has been properly received or not.

This action relates to Actions 405 and 602 which will be described below.

Action 308

The second WLAN node 214 may transmit a recommended MCS index. In other words, the first WLAN node 212 may receive the recommended MCS index from the second WLAN node 214.

The recommended MCS index may be used by the first WLAN node 212 when the first WLAN node 212 overhears a second first signal $S1_2$ transmitted from the third WLAN node 222 to the fourth WLAN node 224 and is to perform a transmission of a second second signal $S2_2$ to the second WLAN node 214. Thus, the recommended MCS index may be used when transmitting the second second signal $S2_2$ after a previous transmission of the second signal S2.

The actions performed by the first WLAN node 212 to transmit the second second signal $S2_2$ after overhearing the second first signal $S1_2$ transmitted from the third WLAN node 222 to the fourth WLAN node 224 may be accomplished after the first WLAN node 212 has transmitted the second signal S2 to the second WLAN node 214, and may correspond to the actions 302-306 described above. As previously mentioned, the first WLAN node 212 may transmit the second signal S2 after overhearing the first signal S1 transmitted from the third WLAN node 222 to the fourth WLAN node 224.

By using the recommended MCS index when transmitting the second second signal $S2_2$ to the second WLAN node 214, the quality of the received signal at the second WLAN node 214 may be improved as compared to the quality of the second signal S2 received at the second WLAN node 214.

This action relates to Actions 406 and 603 which will be described below.

Action 309

The first WLAN node 212 may update the link adaptation process. The first WLAN node 212 may update the link adaptation process by taking an ACK, a NACK or a missing ACK as an input and provide an MCS, e.g. an updated MCS index, as output.

As previously mentioned, the link adaptation process is specific for the third WLAN node 222. Further, the updated link adaptation process is to be used by the first WLAN node 212 when determining a new updated MCS index after overhearing the second first signal $S1_2$ transmitted from the third WLAN node 222 to the fourth WLAN node 224. Thus, when a link adaptation process has been used to determine an MCS index the link adaptation may be updated, and the updated link adaptation process is to be used to determine a new updated MCS index to be used when the first WLAN node 212 transmits the second second signal $S2_2$ to the second WLAN node 214 after overhearing the second first signal $S1_2$.

This action relates to Action 407 which will be described below.

Action 310

The first WLAN node 212 may defer from transmitting the second signal S2 to the second WLAN node 214 in order to avoid unsuccessful transmissions. That is, to avoid transmission of the second signal S2 when it will not be received successfully at the second WLAN node 214. For example, this may be the case when the lowest MCS index, e.g. an MCS index of 0, has been tried a predefined number of times during a predefined period of time without success. In such case, the first WLAN node 212 may defer from further attempts to transmit the second signal S2.

This action relates to Action 408 which will be described below.

Figure 4:
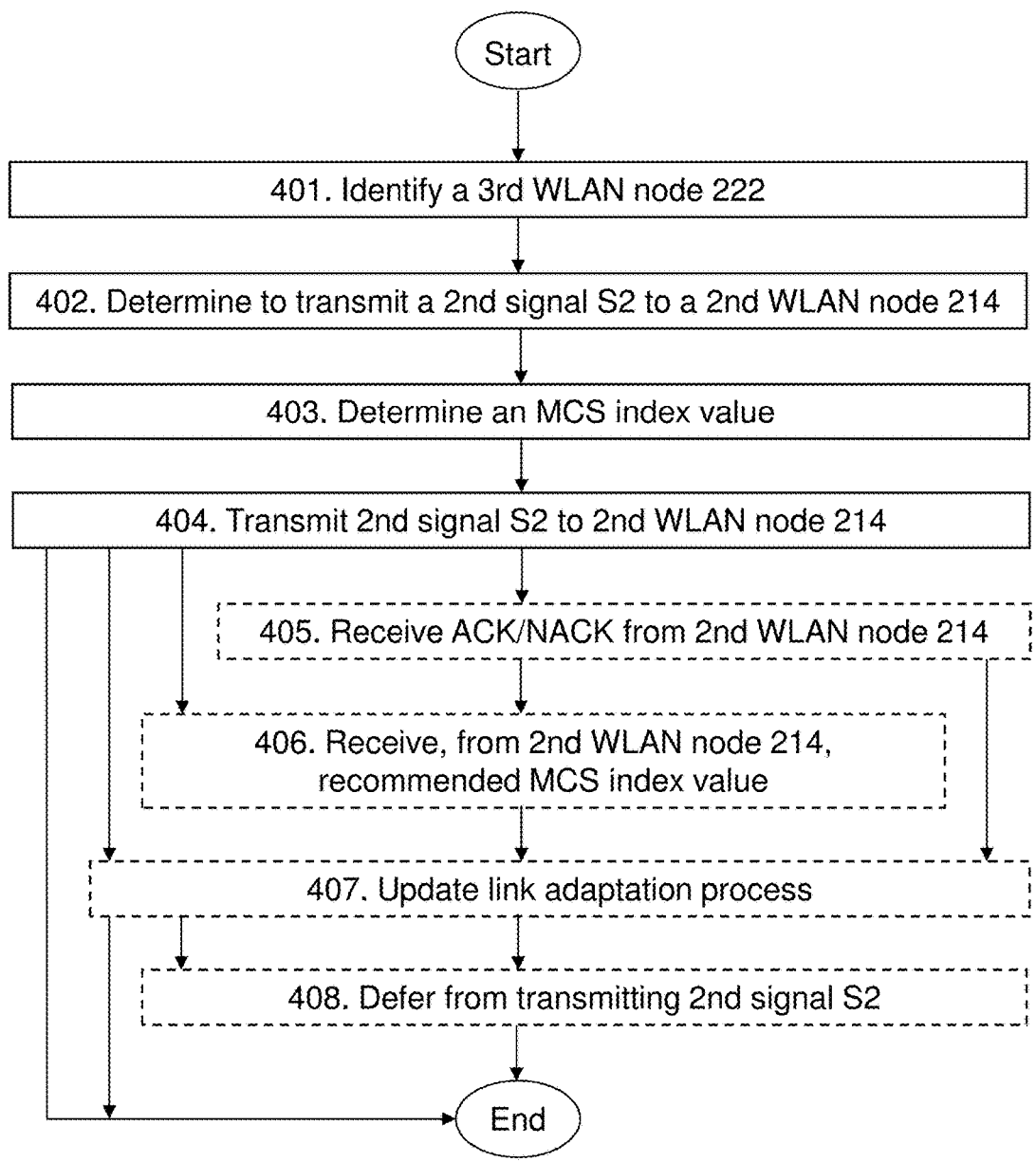
FIG. 4 is a flowchart depicting embodiments of a method performed by a first WLAN node.

An example of a method performed by the first WLAN node 112 for performing a transmission to the second WLAN node 214 in the WLAN 200 will now be described with reference to a flow chart depicted in FIG. 4. As mentioned above, the first and second WLAN nodes 212, 214 are comprised in the first coverage area 210. The method comprises one or more of the following actions. It should be understood that some actions may be optional, that these actions may be taken in another suitable order and that some actions may be combined.

Action 401

The first WLAN node 212 identifies a third WLAN node 222 transmitting a first signal S1 overheard by the first WLAN node 212.

In some embodiments, the first WLAN node 212 identifies the third WLAN node 222 by reading one or more fields in a PHY header and/or a MAC header of the first signal S1.

Alternatively or additionally, the first WLAN node 212 may identify the third WLAN node 222 by reading a PAID field of a VHT PHY header of the first signal S1. The PAID field comprises an unique identifier of the third WLAN node 222. Further, the first WLAN node 212 may identify the third WLAN node 222 by reading the PAID field when the interfering transmission, e.g. the overheard first signal S1, is a downlink transmission, e.g. from an AP to a STA. In such cases the third WLAN node 222 is the AP transmitting the first signal S1 to the fourth WLAN node 224 being the STA.

In some embodiments, the first WLAN node 212 identifies the third WLAN node 222 by reading a Source Address (SA) field of the MAC header of the first signal S1. The SA field comprises an unique identifier, e.g. a MAC address, of the third WLAN node 222. Further, the first WLAN node 212 may identify the third WLAN node 222 by reading the SA field when the interfering transmission, e.g. the overheard first signal S1, is an uplink transmission, e.g. from a STA to an AP. In such cases the third WLAN node 222 is the STA transmitting the first signal S1 to the fourth WLAN node 224 being the AP.

As mentioned above, in some embodiments, the first WLAN node 212 decodes the PHY header of the overheard first signal S1 and reads the PAID field. For UL transmissions, the PAID value is identical to bitwise parts of the receiver's, e.g. the fourth WLAN node's 224, BSSID. For DL transmissions, the PAID value is a bitwise combination of the receiver's, e.g. the fourth WLAN node's 224, AID and the transmitter's, e.g. the third WLAN node's 222, BSSID. The PAID value is designed to be a unique identifier of WLAN nodes. Since the BSSID values are known to the first WLAN node 212 it may infer the BSSID from the PAID in the DL case. The direction of the transmission may be found by reading the Group ID field of the VHT SIG A1, which is set to 63 for DL transmissions, and 0 for UL transmissions.

The first WLAN node 212 may conclude the bitwise parts of the BSSID for both the UL and the DL cases through a bit processing function F1, which is known from the definition of PAID, and thereby add a detected PAID value to a list of PAID values PAID_BSS if found to be identical to the first WLAN node's 212 BSSID.

In some embodiments and for DL transmissions e.g. from an AP to an STA, the bit processing function F1 may be exemplified as mod $2^9$ (dec(AID[0:8])+$2''5$*dec(BSSID[44:47] XOR BSSID[40:43])) wherein AID is the AID for the STA and the BSSID is the BSSID for the AP. Further, in some embodiments, the first WLAN node 212 keeps and updates a list of detected BSSID values, and calculates the list PBSSID_i=$2^5$*dec(BSSID_i[44:47] XOR BSSID[40:43]) wherein PBSSID is the Partial BSSID. The first WLAN node 212 may then compare a detected PAID value with the list of BSSID values and identify the BSSID_i through the comparison argmin(PAID-PBSSID_i, PAID-PBSSID_i>0), that is the BSSID giving the lowest positive difference between PAID and PBSSID. It should be understood that the functions given above are only given as examples and that other implementations are possible.

Thus, after becoming connected to the WLAN 200, the first WLAN node 212 may start assembling a list of BSS PAID values PAID_BSS by overhearing other transmissions, processing the PAID values and comparing them to the serving BSSID. But also during the first detected transmission from the third WLAN node 222 with a PAID value PAID_i, the first WLAN node 212 may conclude whether the PAID value PAID_i of the third WLAN node 222 is within the same BSS or not, e.g. within the same coverage area or not.

If the overheard first signal S1 is determined to be a DL transmission, e.g. the fourth WLAN node 224 receiving the transmission is a STA in a neighbor BSS, e.g. in the second coverage area 220, the variable index value IND identifying the third WLAN node 222 is set to the parts of BSSID present in the PAID found through a bit processing function F1. The direction of the overheard first signal S1 may be found by reading the Group ID field of the VHT SIG A1, which is set to 63 for DL transmissions.

If the overheard first signal S1 is determined to be an UL transmission, e.g. the fourth WLAN node 224 receiving the transmission is an AP in a neighboring BSS, e.g. in the second coverage area 220, the PAID does not contain enough information to determine the identity of the third WLAN node 212 transmitting the first signal S1. For UL transmissions the Group ID field is set to 0. In this case the MAC header has to be decoded in order to find the identity of the third WLAN node 222. After the MAC header has been decoded by the first WLAN node 212, Source Address (SA) field may be used to identify the third WLAN node 222. In this case the first WLAN node 212 sets the variable index value IND identifying the third WLAN node 222 to IND=SA. It is also possible to shorten the SA in some way, e.g. to only use the N_bits significant bits in the SA as IND=F2(MAC SA) for a second function, e.g. a bit selection function, F2.

In some embodiments, the second function F2 may be configured to determine the variable index value IND as IND=dec(MAC SA[40:47]), that is to determine the variable index value IND to be equal to the 8 lowest bits of the MAC SA in decimal notation. However, it should be understood that this is only given as an example and that other examples are possible.

The obtained IND value should be assigned such that it is a unique identifier of the third WLAN node 222.

Further, the first WLAN node 212 may identify the third WLAN node 222 by reading and/or decoding a colour field of the PHY header and comparing the read and/or decoded colour with a colour of the first WLAN node 212. If the read colour is the same as the colour of the first WLAN node 212, the first WLAN node 212 will refrain from transmitting. On the other hands, if the read colour is different from the colour of the first WLAN node 212, the third WLAN node 222 belongs to a different BSS than the first WLAN node 212 and thus the first WLAN node 212 may determine to transmit a second signal S2 to the second WLAN node 214. This will be described in more detail in Action 402 below.

The BSS Color bit was introduced by the 802.11ah Task Group. Each BSS may select or may be assigned a BSS Color value in the range 0-7. If the Color field is present in the received PHY header, the first WLAN node 212 may determine if the overheard first signal S1 belongs to the BSS, e.g. the first coverage area 210, with which the first WLAN node 212 is associated. In such case, the first WLAN node 212 may refrain from further processing of the overheard first signal S1.

This action relates to Actions 302 and 303 described above.

Action 402

The first WLAN node 212 determines to transmit, to the second WLAN node 214, a second signal S2 based on the identity of the third WLAN node 222 and on a received power of the first signal S1. As mentioned above, the identity of the third WLAN node 222 may be given by or relating to the obtained index value IND. Further, the received power of the first signal S1 may be determined and/or measured by the first WLAN node 212.

In some embodiments, the first WLAN node 212 further determines to transmit the second signal S2 when the third WLAN node 222 is comprised in a second coverage area 220, which second coverage area 220 is at least partly overlapping the first coverage area 210. In other words, the first WLAN node 212 determines to transmit the second signal S2 when the first and third WLAN nodes 212, 222 are comprised in different BBS. The first and second coverage areas 210, 220 may be referred to as overlapping coverage areas. Thus, the first and second BSSs may be different BSSs that are Overlapping BSSs (OBSSs).

Further, the first WLAN node 212 may determine to transmit the second signal S2 when the received power of the overheard first signal S1 is below a predefined threshold value. For example, the predefined threshold value may be equal to or higher than −82 dBm (Decibel-milliWatts). Thus, if the received power of the overheard first signal S1 is below the predefined threshold value, the third WLAN node 222 is considered to be located far enough away from the first WLAN node 212 so the transmission of the second signal S2 will not cause interference, e.g. harmful interference, at the third WLAN node 222.

In some embodiments, when the third WLAN node 222 is unidentifiable or when the first signal S1 is a non-WLAN signal, the first WLAN node 212 determines to transmit the second signal S2 in accordance with a legacy operation.

This action relates to Action 304 described above.

Action 403

When determined to transmit the second signal S2 to the second WLAN node 214, the first WLAN node 212 determines a MCS index by means of a link adaptation process specific for the identified third WLAN node 222. In some embodiments, the link adaptation is also specific for the first WLAN node 212 and the second WLAN node 214 when the first WLAN node 212 overhears the first signal S1 from the third WLAN node 222 and when the first WLAN node 212 is to transmit the second signal S2 to the second WLAN node 214.

The link adaptation process may be a Minstrel process or an adaptive auto rate fall-back process.

As mentioned above, the link adaptation process is specific for the identified third WLAN node 222, and thus it should be understood that first WLAN node 212 may use different link adaptation processes when determining the MCS index depending on the identity of the third WLAN node 222 transmitting the first signal S1. Further, several implementations are possible for the one or more Link Adaptation (LA) processes that the first WLAN node 212 may use and/or update.

It should be understood that when there is no first signal S1 transmitted from the third WLAN node 222 to the fourth WLAN node 224, e.g. the channel is clear, a default link adaptation process, e.g. the Minstrel process, should be used for the transmission of the second signal S2 from the first WLAN node 212 to the second WLAN node 214. The default link adaptation process is specific for the first and second WLAN nodes 212, 214.

In some embodiments, the first WLAN node 212 determines the MCS index as a start MCS index for the third WLAN node 222 by mapping an estimated SINR, or a measured received signal strength to the start MCS index by means of a mapping function. The measured received signal strength of the overheard first signal S1 may be a measured received power of the first signal S1 at the first WLAN node 212.

Alternatively, the first WLAN node 212 may determine the MCS index as a predefined start MCS index for the third WLAN node 222. For example, this may be done when there is no previous information available regarding the third WLAN node's 222 MCS index. Given a value of a Received Signal Strength Indicator (RSSI) and a received (RX) power, the first WLAN node 212 may map an estimated SINR value to the predefined start MCS index through a third function F3.

In some embodiments, the initial MCS index is calculated from the third function F3, e.g. a linear function, based on the received signal power, RX_pow, (given in dBm) of the first signal S1 transmitted from the third WLAN node 222. Thus, the initial MCS index may be give as MCS=min (MCS_max, max(0, floor((−82−RX_pow(dBm))/2))), where MCS_max is the highest available MCS index. However, it should be understood that this is given only as an example and that other examples are possible.

Alternatively, the predefined start MCS index is set to a first fixed predefined start index MCS_start1 for the case when the variable index value IND is set to 0, IND=0, and set to a second fixed predefined start index MCS_start2 otherwise, where MCS_start2<=MCS_start1.

In some embodiments, the variable index value IND is used to determine the MCS index. In such embodiments, each unique IND has a corresponding MCS value that may be used as the MCS index, e.g. the start MCS index. As exemplified in the table below, a variable index value IND equal to 0 implies that there is no ongoing transmissions, e.g. no first signal S1, and may be mapped to an MCS index of 15. A variable index value IND equal to BSSID2 maps to an MCS index of 5. Further, a variable index value IND equal to MAC_SA_1 maps to an MCS index of 9. Furthermore, a variable index value IND equal to BSSID1 maps to an MCS index of −1, whereby the first WLAN node 212 will defer from transmitting the second signal S2. Yet further, other values of the variable index value IND may be mapped to an MCS index of empty. An MCS index of empty means that the MCS index is missing and has to be determined.

| IND | MCS |
| --- | --- |
| 0 | 15 |
| BSSID1 | 5 |
| MAC_SA_1 | 9 |
| BSSID2 | −1 |
| other | empty |

It should be understood that the MCS indices given above are just given as examples and that other suitable MCS indices may be used.

In some embodiments, the determined MCS index is used as a weight in determining the MCS index to be used for transmission. In such embodiments, a factor of the determined MCS index together with other inputs such as RX power and RRSI may be used to determine the MCS index to be used for transmission.

Action 404

The first WLAN node 212 transmits, to the second WLAN node 214, the second signal S2 using the determined MCS index.

In some embodiments, the first WLAN node 212 transmits, to the second WLAN node 214, the second signal S2 using an average of the determined MCS index and of one or more previously determined MCS indices.

Action 405

The first WLAN node 212 may receive an acknowledgement of receipt from the second WLAN node 214. The acknowledgment of receipt may be transmitted from the second WLAN node 214 to the first WLAN node 212 when the first WLAN node 212 has transmitted the second signal S2 to the second WLAN node 214.

As previously mentioned, the acknowledgement of receipt may comprise an affirmative response, e.g. an ACK or NACK. Thereby, the first WLAN node 212 is informed by the second WLAN node 214 whether or not the second signal S2 or a part thereof has been properly received or not.

This relates to Action 307 described above and to Action 602 to be described below.

Action 406

In some embodiments, the first WLAN node 212 receives, from the second WLAN node 214, information relating to a recommended MCS index to be used when transmitting to the second WLAN node 214. As mentioned above, the recommended MCS index may be used by the first WLAN node 212 when transmitting the second second signal $S2_2$ to the second WLAN node 214 after overhearing the second first signal $S1_2$ transmitted from the third WLAN node 222 to the fourth WLAN node 224 and after a previous transmission of the second signal S2 to the second WLAN node 214 after overhearing the first signal S1 transmitted from the third WLAN node 222 to the fourth WLAN node 224.

The information relating to the recommended MCS index may be comprised in a Channel Quality Indicator (CQI). In some embodiments, the recommend index value is comprised in a feedback message from the second WLAN node 214 to the first WLAN node 212. The feedback message may comprise an ACKnowledge character (ACK) or a Non-ACKnowledge character (NACK).

Further, the information relating to the recommended MCS index may be an explicit MCS index recommendation.

This relates to Action 308 previously described and to Action 603 to be described below.

Action 407

In some embodiments, the first WLAN node 212 updates the link adaptation process specific for the identified third WLAN node 222.

For example, the first WLAN node 212 updates the link adaptation process by taking an ACK, a NACK, or a missing ACK as an input and then give an MCS, e.g. an MCS index, as an output.

This relates to Action 309 previously described.

Action 408

In some embodiments, the determined MCS index corresponds to a predefined stop value. For example, when repeated transmissions of the second signal S2 with the determined MCS index equal to 0 and within a predefined period of time has failed the first WLAN node 212 choose to stop trying. In such embodiments, the first WLAN node 212 defers from transmitting, to the second WLAN node 214, the second signal S2 using the determined MCS index.

This relates to Action 310 previously described.

Figure 5:
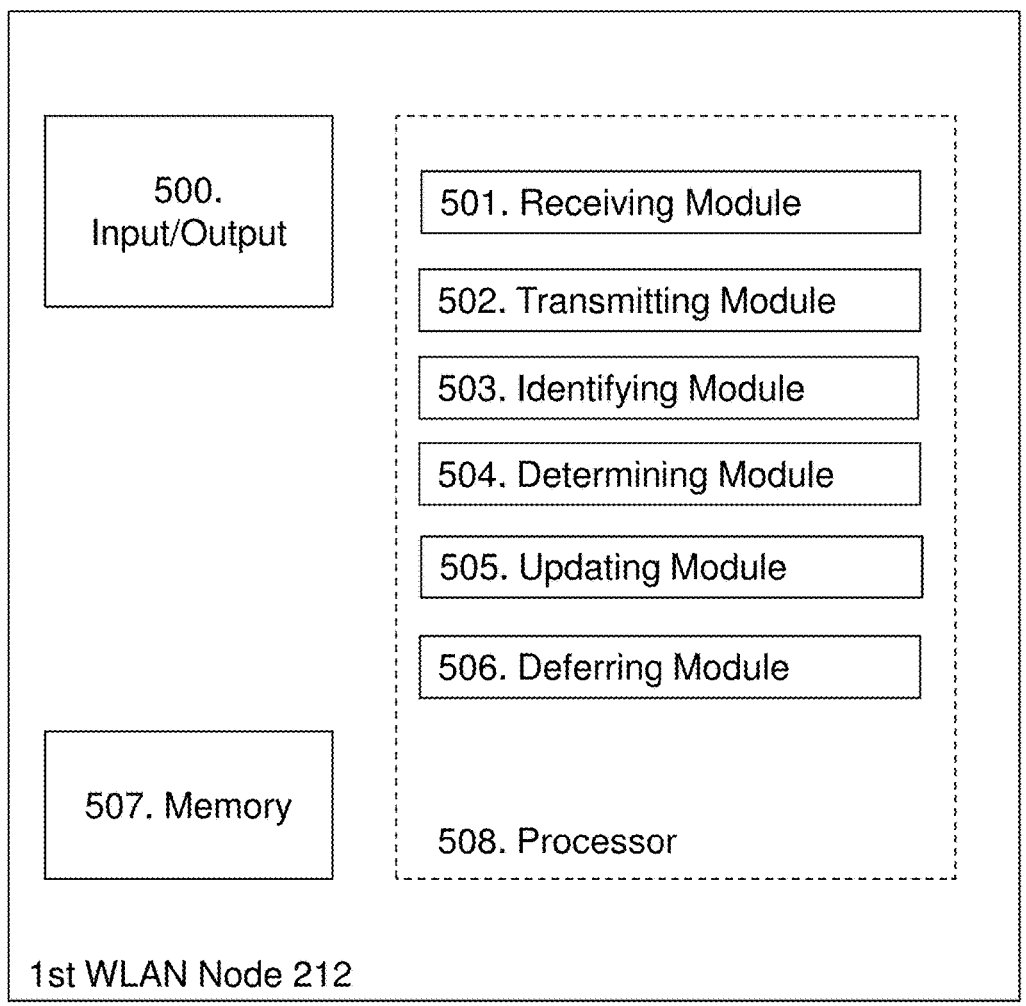
FIG. 5 is a schematic block diagram illustrating embodiments of a first WLAN node.

To perform the method for performing a transmission to the second WLAN node 214 in the WLAN 200, the first WLAN node 212 may be configured according to an arrangement depicted in FIG. 5. As previously mentioned, the first and second WLAN nodes 212, 214 are comprised in the first coverage area 210.

In some embodiments, the first WLAN node 212 comprises an input and/or output interface 500 configured to communicate with one or more other network nodes, e.g. WLAN nodes, such as the second WLAN node 214. The input and/or output interface 500 may comprise a wireless receiver and a wireless transmitter.

The first WLAN node 212 is configured to receive, e.g. by means of a receiving module 501 configured to receive, transmissions from the second WLAN node 214.

The receiving module 501 may be the wireless receiver or a processor 508 of the first WLAN node 212. The processor 508 will be described in more detail below.

The first WLAN node 212 may receive an acknowledgement of receipt from the second WLAN node 214. The acknowledgment of receipt may be transmitted from the second WLAN node 214 to the first WLAN node 212 when the first WLAN node 212 has transmitted the second signal S2 to the second WLAN node 214.

Further, the first WLAN node 212 may be configured to receive, from the second WLAN node 214, information relating to a recommended MCS index to be used when transmitting to the second WLAN node 214.

The information relating to the recommended MCS index may be comprised in a CQI. As previously mentioned and in some embodiments, the recommend MCS index is comprised in a feedback message from the second WLAN node 214 to the first WLAN node 212. The feedback message may comprise an ACK or a NACK.

Further, the information relating to a recommended MCS index is an explicit MCS index recommendation.

In some embodiments, the first WLAN node 212 is configured to receive an acknowledgement of receipt from the second WLAN node 214. As previously mentioned, the acknowledgment of receipt may be transmitted from the second WLAN node 214 to the first WLAN node 212 when the first WLAN node 212 has transmitted the second signal S2 to the second WLAN node 214.

The first WLAN node 212 may further be configured to transmit, e.g. by means of a transmitting module 502 configured to transmit, a second signal S2 to the second WLAN node 214. The transmitting module 502 may be the wireless transmitter or the processor 508 of the first WLAN node 212.

The first WLAN node 212 may transmit the second signal S2, when the first WLAN node 212 has determined to transmit the second signal and when the first WLAN node 212 has determine a MCS as will be described below.

Further, the first WLAN node 212 may transmit the second signal S2 using the determined MCS index.

In some embodiments, the first WLAN node 212 is configured to transmit, to the second WLAN node 214, the second signal S2 using the determined MCS index by further being configured to transmit the second signal S2 using an average of the determined MCS index and of one or more previously determined MCS indices.

The first WLAN node 212 is further configured to identify, e.g. by means of a identifying module 503 configured to identify, a third WLAN node 222 transmitting a first signal S1 overheard by the first WLAN node 212.

The identifying module 503 may be the processor 508 of the first WLAN node 212.

In some embodiments, the first WLAN node 212 is configured to identify the third WLAN node 222 by reading one or more fields in a PHY header and/or a MAC header of the first signal S1.

Further, in some embodiments, the first WLAN node 212 is configured to identify the third WLAN node 222 by reading a PAID field of a VHT PHY header of the first signal S1. As previously mentioned, the PAID field comprises an unique identifier of the third WLAN node 222. Further and as also previously mentioned, the first WLAN node 212 may identify the third WLAN node 222 by reading the PAID field when the interfering transmission, e.g. the overheard first signal S1, is a downlink transmission, e.g. from an AP to a STA. In such cases the third WLAN node 222 is the AP transmitting the first signal S1 to the fourth WLAN node 224 being the STA.

The first WLAN node 212 may be configured to identify the third WLAN node 222 by reading an SA field of the MAC header of the first signal S1. As previously mentioned, the SA field comprises an unique identifier of the third WLAN node 222. Further, the first WLAN node 212 may identify the third WLAN node 222 by reading the SA field when the interfering transmission, e.g. the overheard first signal S1, is an uplink transmission, e.g. from a STA to an AP. In such cases the third WLAN node 222 is the STA transmitting the first signal S1 to the fourth WLAN node 224 being the AP.

In some embodiments, the first WLAN node 212 is configured to identify the third WLAN node 222 by reading a colour field of the PHY header and comparing the read colour with a colour of the first WLAN node 212. For example, if the colours are the same, the third WLAN node 222 belongs to the same coverage area, e.g. the first coverage area 210, as the first WLAN node 212 and that knowledge serves as a sufficient identification of the third WLAN node 222.

The first WLAN node 212 is further configured to determine, e.g. by means of a determining module 504 configured to determine, to transmit, to the second WLAN node 214, a second signal S2 based on the identity of the third WLAN node 222 and on a received power of the first signal S1.

The determining module 504 may be the processor 508 of the first WLAN node 212.

In some embodiments, the first WLAN node 212 is configured to determine to transmit the second signal S2 when the third WLAN node 222 is comprised in a second coverage area 220, which second coverage area 220 is different from the first coverage area 210. The first and second coverage areas 210, 220 may be overlapping coverage areas. Thus, the first and second BSSs may be OBSSs.

Further, the first WLAN node 212 may be configured to determine to transmit the second signal S2 when the received power of the overheard first signal S1 is below a predefined threshold value. As previously mentioned, the predefined threshold value may for example be equal to or higher than −82 dBm (Decibel-milliWatts). Thus, if the received power of the overheard first signal S1 is below the predefined threshold value, the third WLAN node 222 is considered to be located far enough away from the first WLAN node 212 so the transmission of the second signal S2 may not cause interference, e.g. harmful interference, at the intended receiver of the first signal S1, i.e. at the fourth WLAN node 224.

When determined to transmit the second signal, the first WLAN node 212 is configured to determine the MCS index by means of a link adaptation process, i.e. a process to adjust the MCS, e.g. the MCS index, in order to transmit with the highest possible rate while keeping the error rate within a limit, specific for the identified third WLAN node 222.

The link adaptation process may be a Minstrel process or an adaptive auto rate fall-back process.

In some embodiments, the first WLAN node 212 is configured to determine the MCS index by further being configured to determine the MCS index as a start MCS index for the third WLAN node 222 by mapping an estimated SINR or a measured received signal strength to the start MCS index by means of a mapping function.

Further, the first WLAN node 212 may be configured to determine the MCS index by further being configured to determine the MCS index as a predefined start MCS index for the third WLAN node 222.

In some embodiments, the first WLAN node 212 is configured to determine to transmit the second signal S2 by further being configured to determine to transmit the second signal S2 when the third WLAN node 222 is comprised in a second coverage area 220, which second coverage area 220 is at least partly overlapping the coverage area 210. Thus, the first and second BSS may different BSSs and they may be overlapping BSS.

Further, the first WLAN node 212 may be configured to determine to transmit the second signal S2 by further being configured to determine to transmit the second signal S2 when the received power is below a predefined threshold value.

In some embodiments, when the third WLAN node 222 is unidentifiable or when the first signal S1 is a non-WLAN signal, the first WLAN node 212 may be configured to determine to transmit the second signal S2 in accordance with a legacy operation.

The first WLAN node 212 may further be configured to update, e.g. by means of an updating module 505 configured to update, the link adaptation process specific for the identified third WLAN node 222.

The updating module 505 may be the processor 508 of the first WLAN node 212.

As previously mentioned, the first WLAN node 212 may be configured to update the link adaptation process by taking an ACK, a NACK, or a missing ACK as an input and then give an MCS, e.g. an MCS index, as an output.

The first WLAN node 212 may further be configured to defer, e.g. by means of an deferring module 505 configured to defer, from transmitting the second signal S2 to the second WLAN node 214.

The deferring module 505 may be the processor 508 of the first WLAN node 212.

In some embodiments, when the determined MCS index corresponds to a predefined stop value, the first WLAN node 212 may defer from transmitting, to the second WLAN node 214, the second signal S2 using the determined MCS index.

The first WLAN node 212 may also comprise means for storing data such as information relating to the first signal S1, the second signal S2, the WLAN nodes, receiver powers, SINR, BSS, PAID, RSSI, MCS indices, feedback messages, etc. In some embodiments, the first WLAN 212 comprises a memory 507 configured to store the data. The data may be processed or non-processed data and/or information relating thereto. The memory 507 may comprise one or more memory units. Further, the memory 507 may be a computer data storage or a semiconductor memory such as a computer memory, a read-only memory, a volatile memory or a non-volatile memory. The memory 507 is arranged to be used to store obtained information, data, configurations, schedulings, and applications etc. to perform the methods herein when being executed in the first WLAN node 212.

Embodiments herein for performing a transmission to the second WLAN node 214 may be implemented through one or more processors, such as the processor 508 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the first WLAN node 212. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the first WLAN node 212.

Those skilled in the art will also appreciate that the transmitting module, receiving module, and configuring module described above may refer to a combination of analog and digital circuits, and/or one or more processors configured with software and/or firmware, e.g. stored in the memory, that when executed by the one or more processors such as the processors in the first WLAN node 212 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

A method performed by the second WLAN node 214 for assisting the first WLAN node 214 comprised in the WLAN 200 to perform a transmission to the second WLAN node 214 will now be described with reference to a flow chart depicted in FIG. 6. As mentioned above, the first and second WLAN nodes 212,214 are comprised in a first coverage area 210.

The method comprises one or more of the following actions. It should be understood that some actions may be optional, that these actions may be taken in another suitable order and that some actions may be combined.

Action 601

The second WLAN node 214 receives, from the first WLAN node 212, the second signal S2 transmitted using the MCS index.

This Action relates to Action 306 previously described.

Action 602

The second WLAN node 214 transmits, to the first WLAN node 212, an acknowledgement of receipt of the second signal S2. The acknowledgement of receipt, e.g. a feedback message, may be a or comprise a positive acknowledgment of receipt such as an ACK or a negative acknowledgment of receipt such as a NACK.

This Action relates to Action 307 previously described.

Action 603

The second WLAN node 214 transmits, to the first WLAN node 212, information relating to a recommended MCS index to be used when the first WLAN node 212 overhears a first signal S1 from a third WLAN node 222 and is to transmit to the second WLAN node 214.

In some embodiments, the second WLAN node 214 transmits, to the first WLAN node 212, information relating to the recommended MCS index to be used for the transmission of the second second signal $S2_2$ to the second WLAN node 214 when the first WLAN node 212 overhears the second first signal $S1_2$ from the third WLAN node 222. The recommended MCS index may be selected such that the received signal quality at the second WLAN node 214 is improved. Thereby, the received signal quality at the second WLAN node 214 may be improved for the reception of the second second signal $S2_2$ as compared to the reception of the second signal S2.

The information relating to the recommended MCS index may be comprised in a CQI. As previously mentioned and in some embodiments, the recommend MCS index is comprised in a feedback message from the second WLAN node 214 to the first WLAN node 212. The feedback message may comprise an ACK or a NACK.

This Action relates to Action 308 previously described.

To perform the method for assisting the first WLAN node 212 comprised in a WLAN 200 to perform a transmission to the second WLAN node 214, the second WLAN node 214 may be configured according an arrangement depicted in FIG. 7. As mentioned above, the first and second WLAN nodes 212,214 are comprised in a first BSS 210.

In some embodiments, the second WLAN node 214 comprises an input and/or output interface 700 configured to communicate with one or more other network nodes, e.g. WLAN nodes such as the first WLAN node 212. The input and/or output interface 700 may comprise a wireless receiver and a wireless transmitter.

The second WLAN node 214 may further be configured to receive, e.g. by means of a receiving module 701, a second signal S2. The receiving module 701 may be the wireless receiver or a processor 704 of the second WLAN node 214. The processor 704 will be described in more detail below.

The second WLAN node 214 may receive, from the first WLAN node 212, the second signal S2 transmitted using the MCS index.

The second WLAN node 214 is configured to transmit, e.g. by means of a transmitting module 702, a transmission to the first WLAN node 212.

The transmitting module 702 may be the wireless transmitter or the processor 704 of the second WLAN node 214.

The second WLAN node 214 may be configured to transmit, to the first WLAN node 212, an acknowledgement of receipt of the second signal S2. As previously mentioned, the acknowledgement of receipt, e.g. a feedback message, may be a or comprise a positive acknowledgment of receipt such as an ACKACK or a negative acknowledgment of receipt such as an NACK.

Further, the second WLAN node 214 may be configured to transmit, to the first WLAN node 212, information relating to a recommended MCS index to be used when the first WLAN node 212 overhears the first signal S1 from the third WLAN node 222 and is to transmit to the second WLAN node 214.

In some embodiments and as mentioned above, the second WLAN node 214 is configured to transmit, to the first WLAN node 212, information relating to the recommended MCS index to be used for the transmission of the second second signal $S2_2$ to the second WLAN node 214 when the first WLAN node 212 overhears the second first signal $S1_2$ from the third WLAN node 222. The recommended MCS index may be selected such that the received signal quality at the second WLAN node 214 is improved. Thereby, the received signal quality at the second WLAN node 214 may be improved for the reception of the second second signal $S2_2$ as compared to the reception of the second signal S2.

The information relating to the recommended MCS index may be comprised in the CQI. As previously mentioned and in some embodiments, the recommend MCS index is comprised in a feedback message from the second WLAN node 214 to the first WLAN node 212. The feedback message may comprise an ACK or a NACK.

The second WLAN node 214 may also comprise means for storing data such as information relating to the first signal S1, the second signal S2, the WLAN nodes, receiver powers, SINR, BSS, PAID, RSSI, MCS indices, feedback messages, etc. In some embodiments, the second WLAN node 214 comprises a memory 703 configured to store the data. The data may be processed or non-processed data and/or information relating thereto. The memory 703 may comprise one or more memory units. Further, the memory 703 may be a computer data storage or a semiconductor memory such as a computer memory, a read-only memory, a volatile memory or a non-volatile memory. The memory 703 is arranged to be used to store obtained information, data, configurations, schedulings, and applications etc. to perform the methods herein when being executed in the second WLAN node 214.

Embodiments herein for assisting the first WLAN node 212 comprised in a WLAN 200 to perform a transmission to the second WLAN node 214 may be implemented through one or more processors, such as the processor 704 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the second WLAN node 214. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the second WLAN node 214.

Those skilled in the art will also appreciate that the transmitting module, receiving module, and adjusting module described above may refer to a combination of analog and digital circuits, and/or one or more processors configured with software and/or firmware, e.g. stored in the memory, that when executed by the one or more processors such as the processors in the second WLAN node 214 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

EXEMPLIFYING EMBODIMENTS

Figure 8:
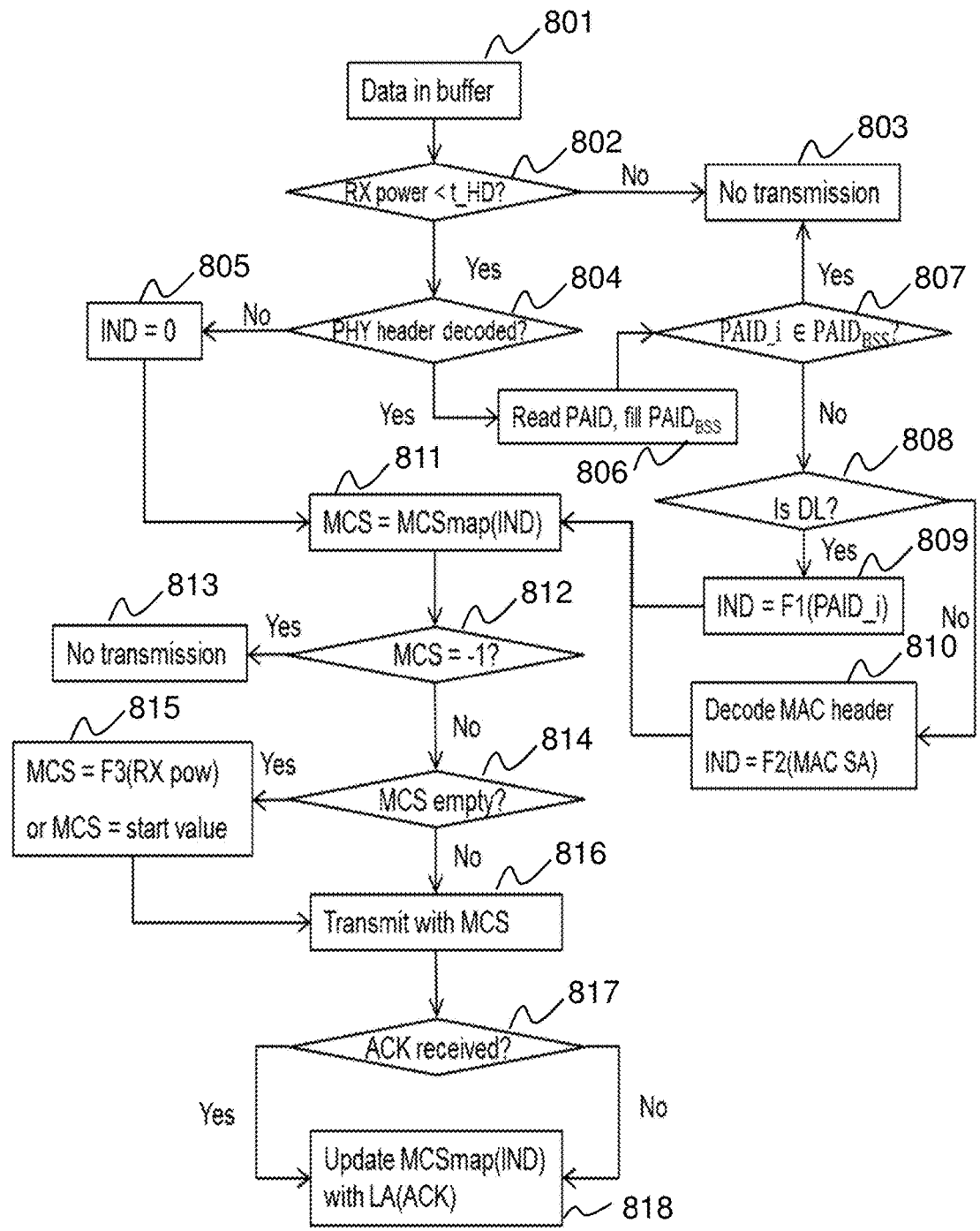
FIG. 8 is a flowchart depicting embodiments of a method performed by a first WLAN node.

Some exemplifying embodiments will now be described with reference to FIG. 8 schematically illustrating a flowchart of an exemplifying method performed by the first WLAN node 212. When the first WLAN node 212 has data to transmit, e.g. data in a buffer, cf. Action 801 of FIG. 8, it performs a CCA, cf. Action 802 of FIG. 8.

If the received power of a sensed transmission, herein also referred to as an interfering signal, a sensed signal or an overheard signal, surpasses a predefined threshold t_HD, the first WLAN node 212, should defer from transmitting, cf. Action 803. The sensed transmission may be the first signal S1 transmitted from the third WLAN node 222 to the fourth WLAN node 224 and overheard by the first WLAN node 212. Action 803 relates to Actions 304 and 402 previously described.

If the received (RX) power of the overheard first signal S1 does not surpass the predefined threshold t_HD, cf. Action 804, the first WLAN node 212 attempts to decode a PHY header comprised in the overheard first signal S1 in order to identify the third WLAN node 222. For example, the value of the predefined threshold t_HD may be equal to or higher than −82 dBm. Action 804 relates to Actions 303 and 401 described above.

As illustrated in Action 805, if there is no PHY header either due to no interfering signal, failed header decoding of the WLAN signal or a non-WLAN signal, the variable index value IND representing the identity of the third WLAN node 222 is set to 0, corresponding to an unidentified interferer, e.g. an unidentified third WLAN node 222 or an unidentified transmitting non-WLAN node. Otherwise, the variable index value IND is a unique identifier of each detected transmitter, such as the third WLAN node 222, in other BSSs. Action 805 relates to Actions 303 and 401 described above.

If a PHY header was decoded, the PAID field is read to the PAID value PAID_i, cf. Action 806. This relates to Actions 303 and 401 described above. In Action 807 the first WLAN node 212 determines if the PAID value PAID_i is present in its list of BSS PAID values, that is the first WLAN node 212 determines if $PAID_i \in PAID_{BSS}$. If so, the PHY header is determined as coming from within the BSS, e.g. the first coverage area 210 with which the first WLAN node 212 is associated, and the first WLAN node 212 does not transmit, cf. Action 803.

If the decoded PHY header is determined to belong to a transmission from another BSS, e.g. from the second coverage area 220, the variable index value IND may be determined by processing of $PAID_i$. In Action 808, the first WLAN node 212 determines whether the overheard first signal S1 is a downlink transmission or an uplink transmission. If the overheard first signal S1 is a downlink transmission, the variable index value IND is determined by processing of $PAID_i$ using the first function F1, cf. Action 809. If the overheard first signal S1 is a downlink transmission, the variable index value IND is determined by processing of $PAID_i$ using the second function F2, cf. Action 810. The purpose of this processing is to determine the identity of the transmitter, e.g. the third WLAN node 222, of the frame and to give it a unique value, IND. The Actions 805, 809 and 810 described above relates to the Actions 303 and 401 previously described.

When the variable index value IND has been determined in accordance with one of the Actions 805, 809 or 810, the MCS index is to be determined.

The MCS index for the first WLAN node's 212 intended transmission, e.g. the second signal S2, may then be determined from a MCS map as MCS=MCSmap(IND). Thus, the determined unique identifier IND is used as an input to determine the MCS index. This is shown in Action 811. This relates to Actions 305 and 403 previously described.

In Action 812 it is checked if the MCS index is equal to −1. If it is equal to −1 it means that the lowest MCS index has been tried without success. Thus, if the MCS index is equal to −1, the first WLAN node 212 does not transmit, cf. Action 813. This relates to Actions 310 and 408.

In Action 814 it is checked if the MCS index is missing. If there is no value, no previous information is available for the third WLAN node's 222 IND, and a first MCS index may then be determined in Action 815 using the third function F3 comprising the received (RX) power and/or a Received Signal Strength Indicator (RSSI), so that a lower RX power would give a higher MCS index and vice versa. As mentioned in Action 815, a fixed starting index may also be used as the first MCS index. This relates to Actions 305 and 403 previously described.

In Action 816 the first WLAN node 212 transmits, to the second WLAN node 214, the second signal S2 using the determined MCS index. In some embodiments, the determined MCS index is used as a weight in determining the MCS index to be used for transmission. In such embodiments, a factor of the determined MCS index together with other inputs such as RX power and RRSI may be used to determine the MCS index to be used for transmission.

The MCS map may be updated after each transmission. That is, the first WLAN node 212 updates the MCS map after the transmission of the second signal S2. Different link adaption (LA) processes may be applied for the update, which should step up and down the MCS index in the allowed range from e.g. 0 to MCSmax. For the 20 MHz channel exemplified in the background section, the MCSmax is 31. However, it should be understood that that is only given as an example and that MCsmax may take any other suitable value. Examples of common LA processes are the Minstrel algorithm and Adaptive auto rate fallback algorithm. This relates to Actions 309 and 407 described above since the output of the LA process may be used as MCS, e.g. as MCS index.

In response to the transmission of the second signal S2, the first WLAN node 212 may receive an acknowledgement of receipt, e.g. a feedback message, from the second WLAN node 214. In Action 817 it is checked whether or not such a receipt is received. This relates to Actions 307 and 405 previously described.

In Action 818, the acknowledgement of receipt is used to update the link adaptation process. This relates to Actions 309 and 407 described above. Thus, a subsequent ACK or a missing ACK may then be used to update the link adaptation process for the unique identifier IND, which will modify the value of MCSmap(IND) with as step operation such that the new value will be MCSmap(IND)+LA(ACK). Here LA(ACK) indicates the step output (positive or negative) from the LA algorithm based on the presence or non-presence of an ACK. The case of IND=0 corresponds to the default link adaptation process.

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first Wireless Local Area Network, WLAN, node for performing a transmission to a second WLAN node in a WLAN, and wherein the method comprises:
   identifying a third WLAN node transmitting a first signal overheard by the first WLAN node;
   determining a Modulation and Coding Scheme, MCS, index value using a link adaptation process specific for the identified third WLAN node;
   transmitting a second signal to the second WLAN node that is configured based on the identity of the third WLAN node and on a received power of the first signal and that uses the determined MCS index.

2. The method of claim 1, wherein the identifying of the third WLAN node further comprises:
   identifying the third WLAN node by reading one or more fields in a physical, PHY, header and/or a Medium Access Control, MAC, header of the first signal.

3. The method of claim 2, wherein the identifying of the third WLAN node further comprises:
   identifying the third WLAN node by reading a Partial Access Identifier, PAID, field of a Very High Throughput, VHT, PHY header of the first signal.

4. The method of claim 2, wherein the identifying of the third WLAN node further comprises:
   identifying the third WLAN node by reading a Source Address, SA, field of the Medium Access Control, MAC, header of the first signal.

5. The method of claim 2, wherein the identifying of the third WLAN node further comprises:
   identifying the third WLAN node by reading a colour field of the PHY header and comparing the read colour with a colour of the first WLAN node.

6. The method of claim 1, wherein the first and second WLAN nodes are comprised in a first coverage area, and wherein the determining to transmit the second signal further comprises:
   determining to transmit the second signal when the third WLAN node is comprised in a second coverage area, which second coverage area is at least partly overlapping the first coverage area.

7. The method of claim 1, wherein the determining to transmit the second signal further comprises:
   determining to transmit the second signal when the received power is below a predefined threshold value.

8. The method of claim 1, wherein the determining to transmit the second signal further comprises:
   when the third WLAN node is unidentifiable or when the first signal is a non-WLAN signal, determining to transmit the second signal in accordance with a legacy operation.

9. The method of claim 1, wherein the determining of the MCS index further comprises:
   determining the MCS index as a start MCS index for the third WLAN node by mapping an estimated Signal-to-Interference-plus-Noise-Ratio, SINR, or a measured received signal strength to the start MCS index by means of a mapping function.

10. The method of claim 1, wherein the determining of the MCS index further comprises:
    determining the MCS index as a predefined start MCS index for the third WLAN node.

11. The method of claim 1, wherein transmitting to the second WLAN node, the second signal using the determined MCS index further comprises:
    transmitting the second signal using an average of the determined MCS index and of one or more previously determined MCS indices.

12. A first Wireless Local Area Network, WLAN, node for performing a transmission to a second WLAN node in a WLAN, and wherein the first WLAN node is configured to:
    identify a third WLAN node transmitting a first signal overheard by the first WLAN node;
    determine a Modulation and Coding Scheme, MCS, index value using a link adaptation process specific for the identified third WLAN node; and
    transmit a second signal to the second WLAN node based on the identity of the third WLAN node and on a received power of the first signal and that uses the determined MCS index.

13. The first WLAN node of claim 12, wherein the first WLAN node is configured to identify the third WLAN node by further being configured to:
    identify the third WLAN node by reading one or more fields in a physical, PHY, header and/or a Medium Access Control, MAC, header of the first signal.

14. The first WLAN node of claim 13, wherein the first WLAN node is configured to identify the third WLAN node by further being configured to:
    identify the third WLAN node by reading a Partial Access Identifier, PAID, field of a Very High Throughput, VHT, PHY header of the first signal.

15. The first WLAN node of claim 13, wherein the first WLAN node is configured to identify the third WLAN node by further being configured to:
    identify the third WLAN node by reading a Source Address, SA, field of the Medium Access Control, MAC, header of the first signal.

16. The first WLAN node of claim 13, wherein the first WLAN node is configured to identify the third WLAN node by further being configured to:
    identify the third WLAN node by reading a colour field of the PHY header and comparing the read colour with a colour of the first WLAN node.

17. The first WLAN node of claim 12, wherein the first and second WLAN nodes are comprised in a first coverage area, and wherein the first WLAN node is configured to determine to transmit the second signal by further being configured to:
    determine to transmit the second signal when the third WLAN node is comprised in a second coverage area, which second coverage area is at least partly overlapping the first coverage area.

18. The first WLAN node of claim 12, wherein the first WLAN node is configured to determine to transmit the second signal by further being configured to:
    determine to transmit the second signal when the received power is below a predefined threshold value.

19. The first WLAN node of claim 12, wherein the first WLAN node is configured to determine to transmit the second signal by further being configured to:
when the third WLAN node is unidentifiable or when the first signal is a non-WLAN signal, determine to transmit the second signal in accordance with a legacy operation.

20. The first WLAN node of claim 12, wherein the first WLAN node is configured to determine the MCS index by further being configured to:
determine the MCS index as a start MCS index for the third WLAN node by mapping an estimated Signal-to-Interference-plus-Noise-Ratio, SINR, or a measured received signal strength to the start MCS index by means of a mapping function.

21. The first WLAN node of claim 12, wherein the first WLAN node is configured to determine the MCS index by further being configured to:
determine the MCS index as a predefined start MCS index for the third WLAN node.

22. A method performed by a second Wireless Local Area Network, WLAN, node for assisting a first WLAN node comprised in a WLAN to perform a transmission to the second WLAN node, wherein the first WLAN node has overheard a first first signal transmitted by a third WLAN node, and wherein the method comprises:
receiving, from the first WLAN node, a first second signal transmitted using a Modulation and Coding Scheme, MCS, index value determined using a link adaptation process specific for the third WLAN node,
transmitting, to the first WLAN node, an acknowledgement of receipt of the first second signal, and
transmitting, to the first WLAN node, information relating to a recommended MCS index to be used that is configured based on the first WLAN node overhearing a second first signal from the third WLAN node and is to transmit a second second signal to the second WLAN node.

23. The method of claim 22, wherein the information relating to the recommended MCS index is comprised in a Channel Quality Indicator, CQI.

24. A second Wireless Local Area Network, WLAN, node for assisting a first WLAN node comprised in a WLAN to perform a transmission to the second WLAN node, wherein the first WLAN node has overheard a first first signal transmitted by a third WLAN node, and wherein the second WLAN node is configured to:
receive, from the first WLAN node, a first second signal transmitted using a Modulation and Coding Scheme, MCS, index value determined using link adaptation process specific for the third WLAN node,
transmit, to the first WLAN node, an acknowledgement of receipt of the first second signal, and
transmit, to the first WLAN node, information relating to a recommended MCS index to be used that is configured based on the first WLAN node overhearing a second first signal from the third WLAN node and is to transmit a second second signal to the second WLAN node.

25. The second WLAN node of claim 24, wherein the information relating to the recommended MCS index is comprised in a Channel Quality Indicator, CQI.

* * * * *